United States Patent

Birukawa et al.

[11] Patent Number: 5,565,278
[45] Date of Patent: Oct. 15, 1996

[54] MAGNETO-OPTICAL RECORDING MEDIUM

[75] Inventors: Masahiro Birukawa; Motoyoshi Murakami; Hidetsugu Kawabata, all of Hirakata, Japan

[73] Assignee: Matsushita Electric Industrial Co., Ltd., Japan

[21] Appl. No.: 129,578

[22] Filed: Sep. 30, 1993

Related U.S. Application Data

[63] Continuation of Ser. No. 799,995, Nov. 29, 1991, abandoned.

[30] Foreign Application Priority Data

Nov. 29, 1990 [JP] Japan ................... 2-333896

[51] Int. Cl.$^6$ ........................................ G11B 5/66
[52] U.S. Cl. ........................ 428/694 ML; 428/336; 428/694 DE; 428/694 XS; 428/694 RL; 428/694 PR; 428/900; 369/13; 365/122
[58] Field of Search ............ 428/694 DE, 694 PR, 428/694 XS, 694 ML, 900, 694 RL, 336; 369/13; 365/122

[56] References Cited

U.S. PATENT DOCUMENTS

| | | | |
|---|---|---|---|
| 4,786,559 | 11/1988 | Murakami et al. | 428/472 |
| 4,800,122 | 1/1989 | Kano et al. | 428/163 |
| 4,847,132 | 7/1989 | Takao et al. | 428/64.6 |

FOREIGN PATENT DOCUMENTS

| | | |
|---|---|---|
| 293542 | 12/1987 | Japan . |
| 285254 | 12/1987 | Japan . |
| 146255 | 6/1988 | Japan . |
| 252933 | 11/1991 | Japan . |

*Primary Examiner*—Leszek Kiliman
*Attorney, Agent, or Firm*—Wenderoth, Lind & Ponack

[57] ABSTRACT

A magneto-optical recording medium includes a magneto-optical layer, a reflection layer and an inorganic dielectric layer interposed therebetween. The dielectric layer is extremely thin so that it will exhibit almost no optical effect, thereby allowing a high CN ratio to be obtained. Thermal conductivity of the dielectric layer is so low that the magneto-optical and reflection layers are thermally isolated from each other. That is, if refractive index of the dielectric layer is n, thickness of the dielectric layer is T (nm), and the thermal conductivity of the dielectric layer is C (J (m sec K)$^{-1}$), then the thickness T is set within a range that satisfies the following equation:

$$5n-4 \leq T \leq (12n-4)(C/2.1)^{-0.4}$$

where $C \leq 4$ J (m sec K)$^{-1}$.

14 Claims, 6 Drawing Sheets

MAGNETO-OPTICAL RECORDING MEDIUM

This application is a continuation of now abandoned application, Ser. No. 07/799,995, filed Nov. 29, 1991.

BACKGROUND OF THE INVENTION

1. Field of the Invention

The present invention relates to magneto-optical recording media for use in recording information.

2. Description of the Prior Art

In the last few years magneto-optical disks have been developed energetically as rewritable optical disk memories, partly into practical use.

For the structure of the magneto-optical disks, the tri-layered structure has traditionally been proposed. This is a sandwich structure in which a magneto-optical layer is sandwiched on both sides by protection layers. In contrast, a quadri-layered structure, i.e. a first proposal for improvement of the foregoing has been suggested for improving the CN ratio. This is a quadri-layered structure in which a magneto-optical layer having a thickness such as to permit light to be partly transmitted and a reflection layer laid thereon are sandwiched on both sides by protection layers. (For example, see Japanese Patent Laid-Open Publications No. 87332/1980 and No. 12428/1982.) The first improvement proposal, however, has the following drawbacks:

(1) The sensitivity of writing is reduced due to the fact that the reflection layer having a high thermal conductivity is in direct contact with the magneto-optical layer.

(2) In recording with excessive power, thermal diffusion occurring in the reflection layer having a high thermal conductivity is transferred to the magneto-optical layer, directly causing the expansion of the written domain. The result is less writing power allowance.

To overcome these drawbacks, a second improvement has been proposed. This is defined by a structure in which between the magneto-optical layer and the reflection layer as shown in the first improvement proposal there is provided a dielectric layer such as silicon nitride having a thickness such as to contribute to the interference of light (over 40 nm). (For example, see Japanese Patent Laid-Open Publications No. 66549/1982, No. 52442/1984, No. 1637/1985, No. 7631/1985, No. 40542/1985, etc.). The second improvement proposal is so devised that the dielectric layer provided between magneto-optical layer and reflection layer has heat-insulating effect, which has made it possible to avoid the aforementioned two drawbacks.

However, the second improvement proposal involves more pronounced reduction in the reflectance than increase in the kerr rotation angle, thus causing readout signals to be lessened. This is due to the interference effect in the dielectric layer provided between the magneto-optical and reflection layers. The CN ratio is accordingly lowered, disadvantageously.

Consequently, the structure in which the magneto-optical layer and the reflection layer are directly laid one upon another has suffered from the problems of sensitivity reduction and writing power allowance, while that in which between the magneto-optical and reflection layers there is provided a dielectric layer having a thickness such as to contribute to the interference of light has confronted a problem that the CN ratio is lowered. More specifically, to eliminate the need of, or omit any temperature correcting apparatus for laser output, the writing power allowance in which the CN ratio is more than 50 dB is required to exceed ±25%. However, neither the first nor the second improvement proposal has satisfied the above requirement.

SUMMARY OF THE INVENTION

The object of the present invention is therefore to provide a magneto-optical medium which solves these problems and whose writing power allowance in which the CN ratio is more than 50 dB exceeds ±25%.

In order to achieve the aforementioned object, the magneto-optical recording medium of the present invention comprises an inorganic dielectric layer interposed between a magneto-optical layer and a reflection layer, wherein if refractive index of the dielectric layer is n, thickness of the dielectric layer is T (nm), and thermal conductivity of the dielectric layer is C (J (m sec K)$^{-1}$), then the thickness T is within a range that satisfies the following equation:

$$5n-4 \leq T \leq (12n-4)(C/2.1)^{-0.4}$$

where $C \leq 4J$ (m sec K)$^{-1}$.

The present invention has the following two effects by virtue of its foregoing construction:

1. The dielectric layer provided between the magneto-optical and reflection layers is extremely thin so that it will make almost no optical effect, thereby allowing a high CN ratio to be maintained.

2. The thermal conductivity of the dielectric layer provided between the magneto-optical and reflection layers is so low that the magneto-optical and reflection layers are thermally isolated from each other. As a result, it is possible to suppress any expansion of the writing domain due to thermal diffusion in the reflection layer even during write operation with excessive power, thus offering wader write power allowances. That is, a writing power allowance in which the CN ratio is more than 50 dB exceeds ±25% is attained.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention is now described regarding the magneto-optical recording medium of an embodiment of the present invention with reference to the accompanying drawings.

Figure 1:
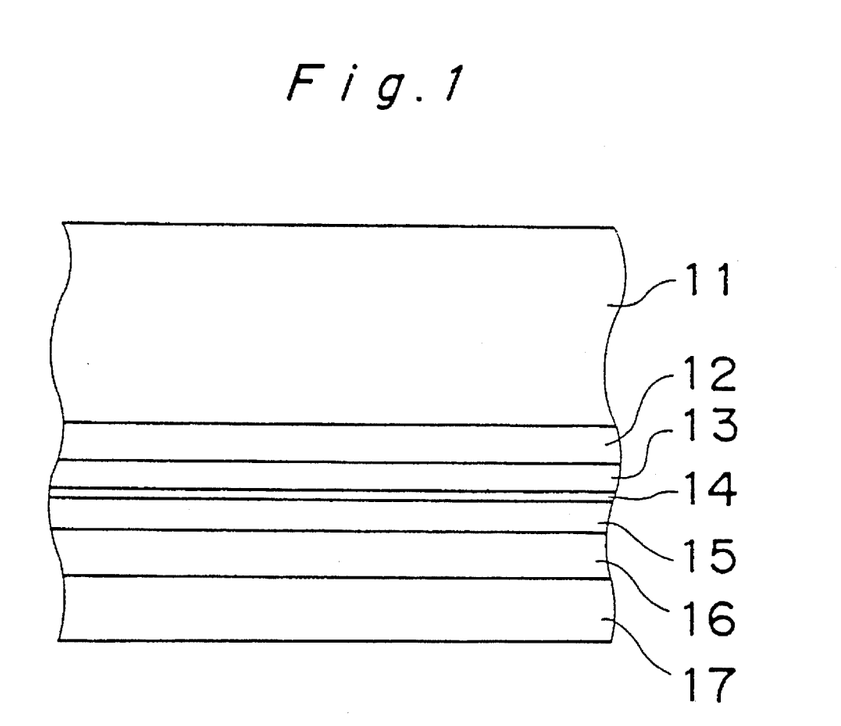
FIG. 1 is a view of a layer construction of a magneto-optical medium in a first embodiment of the present invention.

FIG. 1 illustrates the layer construction of the magneto-optical recording medium according to the present invention. Referring to FIG. 1, a reference numeral 11 designates a 1.2 mm thick substrate made of plastics, a reference numeral 12 designates an enhance layer, reference numeral 13 indicates a magneto-optical layer, a reference numeral 14 indicates a dielectric layer, a reference numeral 15 represents a reflection layer, a reference numeral 16 represents a protection layer, and a reference numeral 17 represents an overcoating layer made of organic material.

As a first embodiment of the present invention, the enhance layer 12 was made of 80 nm thick ZnSe.SiO$_2$; the magneto-optical layer 13 was made of 30 nm thick TbFeCo; and the dielectric layer 14 was made of ZnSe.SiO$_2$. In this case, the refractive index of the dielectric layer 14 was 2.2, and the thermal conductivity was 2.2 J (m sec K)$^{-1}$. The reflection layer 15 was 50 nm thick CuV, and the protection layer 16 was 100 nm thick ZnSe.SiO$_2$. In addition, these layers were all deposited by the sputtering method.

Figure 2:
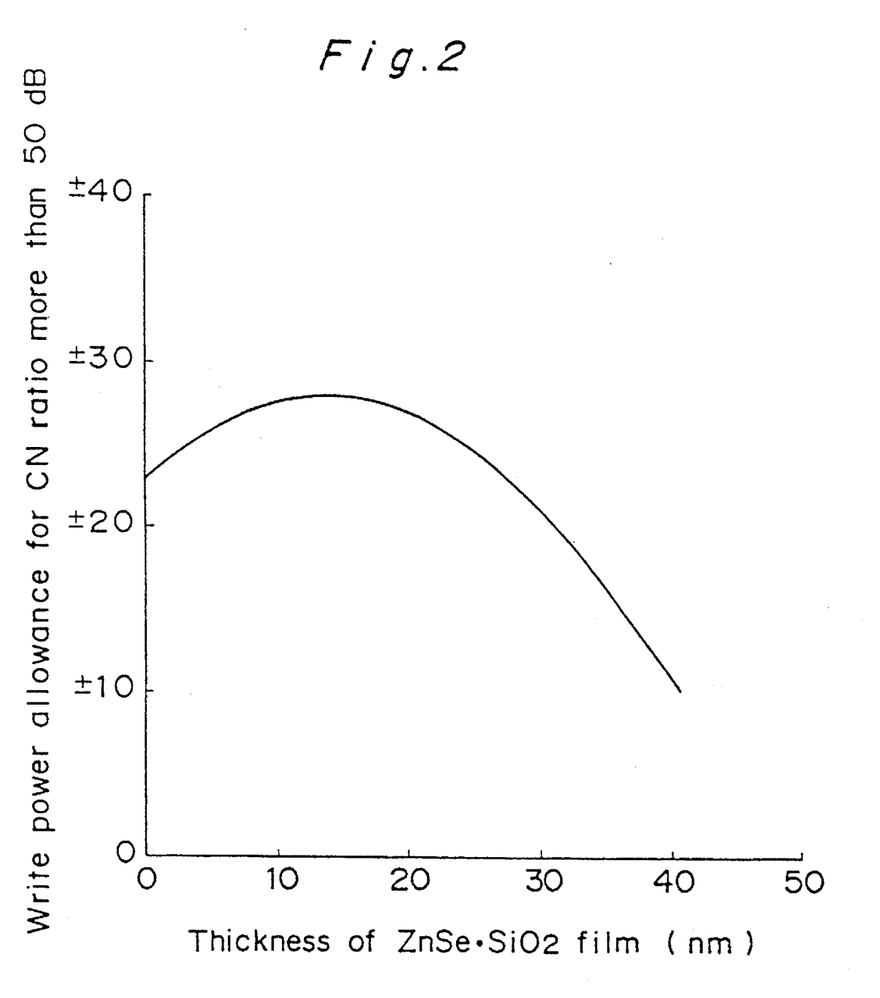
FIGS. 2, 3, 4, 5 and 6 are each characteristic views of embodiments of the present invention.

Writing characteristics of the magneto-optical medium constructed as above are now described with reference to FIG. 2.

Write/read operation was performed using a magneto-optical disk of the above construction, and the CN ratio was measured. The conditions for the write/read operation were a linear velocity of 6 m/s, a signal frequency of 3.85 MHz, a writing pulse width of 86 nsec, and readout power of 1 mW. The laser wavelength used for the write/read operation was 780 nm, and the NA of the objective lens was 0.53. The results are shogun in FIG. 2. In FIG. 2, the vertical axis represents the write power allowance in which the CN ratio more than 50 dB can be obtained. The horizontal axis represents the thickness of the dielectric layer 14 made of ZnSe.SiO$_2$. As apparent from FIG. 2, when ZnSe.SiO$_2$ (refractive index: 2.2, thermal conductivity: 2.2 J (m sec K)$^{-1}$) is used as the dielectric layer 14, a dielectric layer set to above 3 nm and below 24 nm in thickness gives a wide writing power allowance. It is to be noted here that the wide writing power allowance means a writing power allowance of more ±25% in which the CN ratio more than 50 dB can be obtained. In addition, the dielectric layer having a thickness of 13 nm gives the maximum writing power allowance, ±28%. Also, the thickness region of ±57% around the thickness of 13 nm gives a wider writing power allowance as much as more than ±27%.

In contrast to this, in the conventional case where the magneto-optical layer and the reflection layer are in direct contact with each other without the interposition of the dielectric layer 14, that is, where the thickness of the dielectric layer 14 is zero, the writing power allowance in which the CN ratio more than 50 dB can be obtained is as little as ±23%. In another conventional case where the magneto-optical layer and the reflection layer are in contact with each other with the dielectric layer 14 having a thickness of more than 30 nm interposed therebetween, the writing power allowance in which the CN ratio more than 50 dB can be obtained is less than ±21%.

As described above, according to this embodiment, there is provided an extremely thin dielectric layer that meets the above requirements between magneto-optical and reflection layers, whereby the writing power allowance can be expanded considerably.

Next, a second embodiment of the present invention is described with reference to the accompanying drawings.

As the second embodiment, the enhancing layer 12 was made of 80 nm thick ZnS; the magneto-optical layer 13 was made of 40 nm thick TbFeCo; and the dielectric layer 14 was made of ZnS. In this case, the refractive index of the dielectric layer 14 was 2.2, and the thermal conductivity was 2.1 J (m sec K)$^{-1}$. The reflection layer 15 was 40 nm thick AlTi, and the protection layer 16 was 100 nm thick ZnS-.SiO$_2$.

Figure 3:
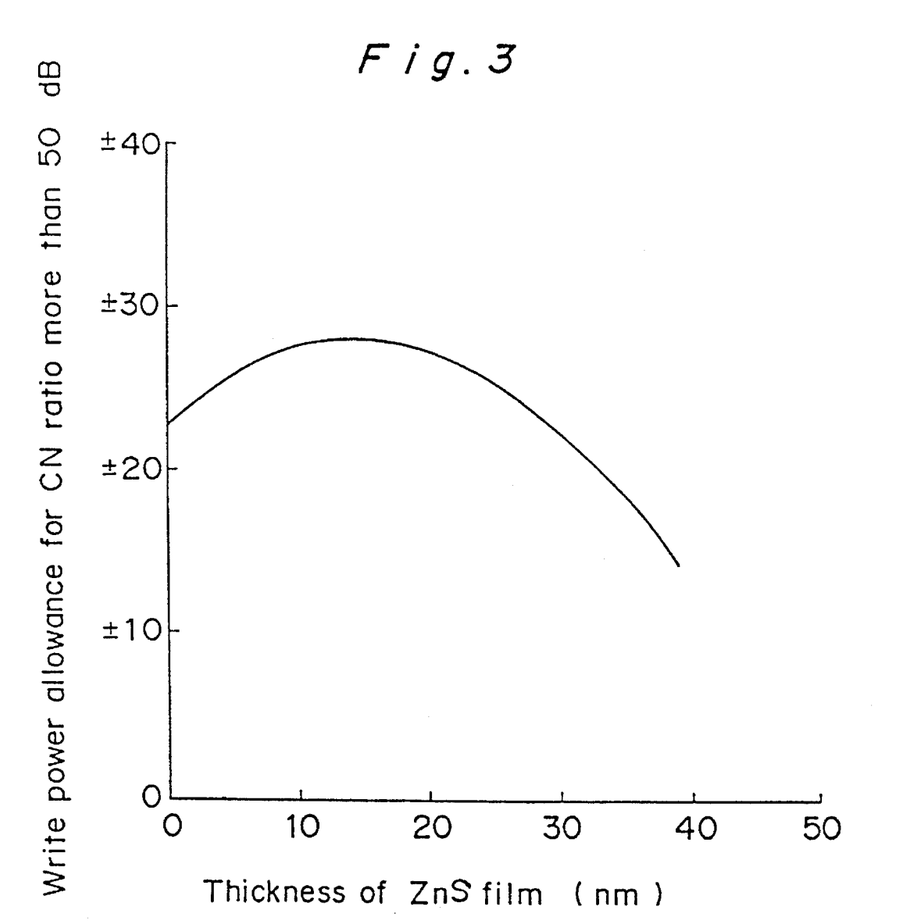

Writing characteristics of the magneto-optical medium constructed as above are now described with reference to FIG. 3.

The write/read operation was performed using a magneto-optical disk of the construction as shown in the second embodiment, and the CN ratio was measured. The conditions for the write/read operation were, as in the first embodiment, a linear velocity of 6 m/s, a signal frequency of 3.85 MHz, a writing pulse width of 86 nsec, and readout power of 1 mW. The laser wavelength used for the write/read operation was 780 nm, and the NA of the objective lens was 0.53. The results are shown in FIG. 3. In FIG. 3, the vertical axis represents the writing power allowance in which the CN ratio more than 50 dB can be obtained. The horizontal axis represents the thickness of the dielectric layer 14 made of ZnS. As apparent from FIG. 3, when ZnS (refractive index: 2.2, thermal conductivity: 2.1 J (m sec K)$^{-1}$) is used-as the dielectric layer 14, a dielectric layer set to above 3 nm and below 24 nm in thickness gives a wide writing power allowance. It is to be noted here that the wide writing power allowance means a writing power allowance of more ±25% in which the CN ratio more than 50 dB can be obtained, as in the first embodiment. In addition, the dielectric layer having a thickness of 13 nm gives the maximum writing power allowance, ±28%. Also, the thickness region of ±60% around the thickness of 13 nm gives a wide writing power allowance as much as more than ±27%.

In contrast, in the conventional case where the magneto-optical layer and the reflection layer are in direct contact with each other without the interposition of the dielectric layer 14, that is, where the thickness of the dielectric layer 14 is zero, the writing power allowance in which the CN ratio more than 50 dB can be obtained is as little as ±23%. In another conventional case where the magneto-optical layer and the reflection layer are in contact with each other with the dielectric layer 14 having a thickness of more than 30 nm interposed therebetween, the writing power allowance in which the CN ratio more than 50 dB can be obtained is less than ±21%.

As described above, according to the second embodiment, there is provided an extremely thin dielectric layer that meets the above requirements between magneto-optical and reflection layers, whereby the writing power allowance can be extended considerably.

As a third embodiment, the enhancing layer 12 was made of 80 nm thick ZnS; the magneto-optical layer 13 was made of 40 nm thick TbFeCo; and the dielectric layer 14 was made of SiO$_2$. In this case, the refractive index of the dielectric layer 14 was 1.5, and the thermal conductivity was 1.5 J (m sec K)$^{-1}$. The reflection layer 15 was 40 nm thick AlTi, and the protection layer 16 was 100 nm thick ZnSe.SiO$_2$.

Figure 4:
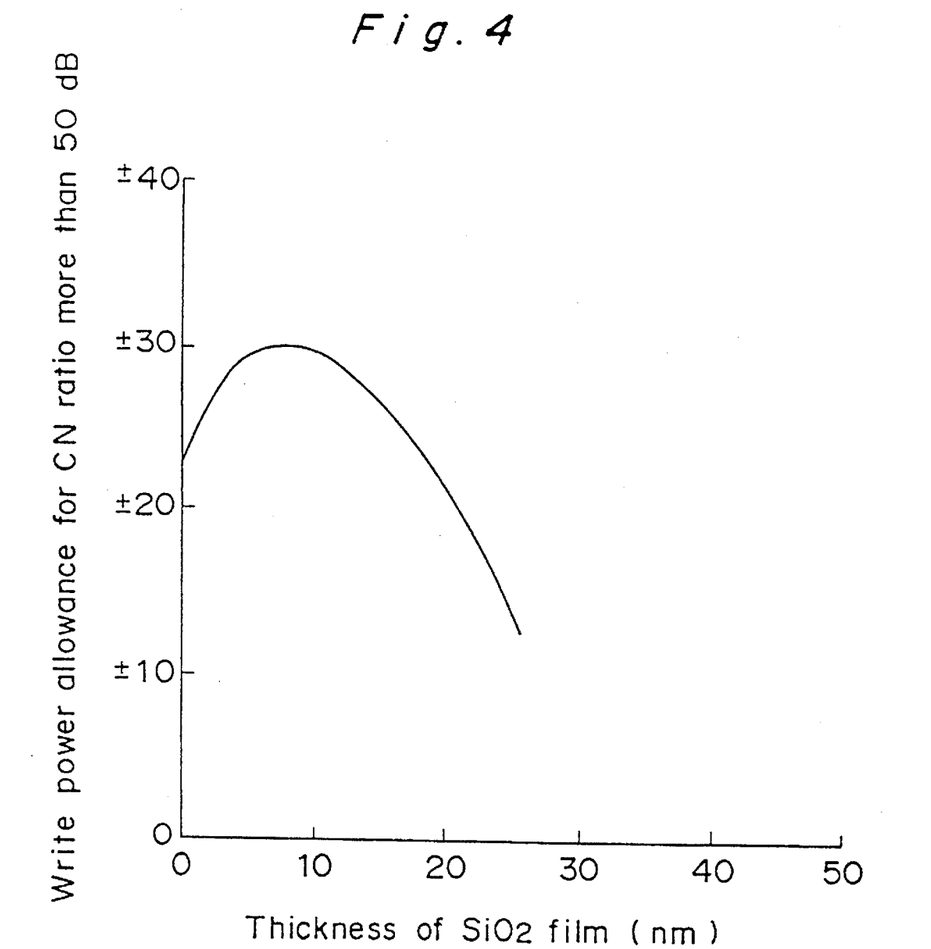

Writing characteristics of the magneto-optical medium constructed as above are now described with reference to FIG. 4.

Write/read operation was performed using a magneto-optical disk of the construction as shown in the third embodiment, and the CN ratio was measured. The conditions for the write/read operation were, as in the first embodiment, a linear velocity of 6 m/s, a signal frequency of 3.85 MHz, a write pulse width of 86 nsec, and readout power of 1 mW. The results are shown in FIG. 4. In FIG. 4, the vertical axis represents the writing power allowance in which the CN ratio more than 50 dB can be obtained. The horizontal axis represents the thickness of the dielectric layer 14 made of SiO$_2$. As apparent from FIG. 4, when SiO$_2$ (refractive index: 1.5, thermal conductivity: 1.5 J (m sec K)$^{-1}$) is used as the dielectric layer 14, a dielectric layer set to above 2 nm and below 17 nm in thickness gives a wide writing power allowance. It is to be noted here that the wide writing power allowance means a writing power allowance of ±25% in which the CN ratio more than 50 dB can be obtained, as in the first embodiment. To add to this, the dielectric layer having a thickness of 8 nm gives the maximum writing power allowance, ±30%. Also, the thickness region of ±45% around the thickness of 8 nm gives a wide writing power allowance as much as more than ±29%.

In contrast to this, in the conventional case where the magneto-optical layer and the reflection layer are in direct contact with each other without the interposition of the dielectric layer 14, that is, where the thickness of the dielectric layer 14 is zero, the writing power allowance in which the CN ratio more than 50 dB can be obtained is as little as ±23%. In another conventional case where the magneto-optical layer and the reflection layer are in contact with each other with the dielectric layer 14 having a thickness of more than 30 nm interposed therebetween, the writing power allowance in which the CN ratio more than 50 dB can be obtained is less than ±10%.

As described above, according to the present invention, there is provided an extremely thin dielectric layer that meets the above requirements between magneto-optical and reflection layers, whereby the writing power allowance can be extended considerably.

As a fourth embodiment, the enhance layer 12 was made of 80 nm thick ZnS; the magneto-optical layer 13 was made of 40 nm thick TbFeCo; and the dielectric layer 14 was made of a mixture of $SiO_2$ and $Al_2O_3$. In this case, the refractive index of the dielectric layer 14 was 1.5 to 1.6 irrespective of the mixing ratio, and the thermal conductivity was subject to change in the range of 1.5 to 20 J $(m\ sec\ K)^{-1}$ depending on the mixing ratio. The reflection layer 15 was 40 nm thick AlTi, and the protection layer 16 was 100 nm thick ZnSe.$SiO_2$.

Figure 5:
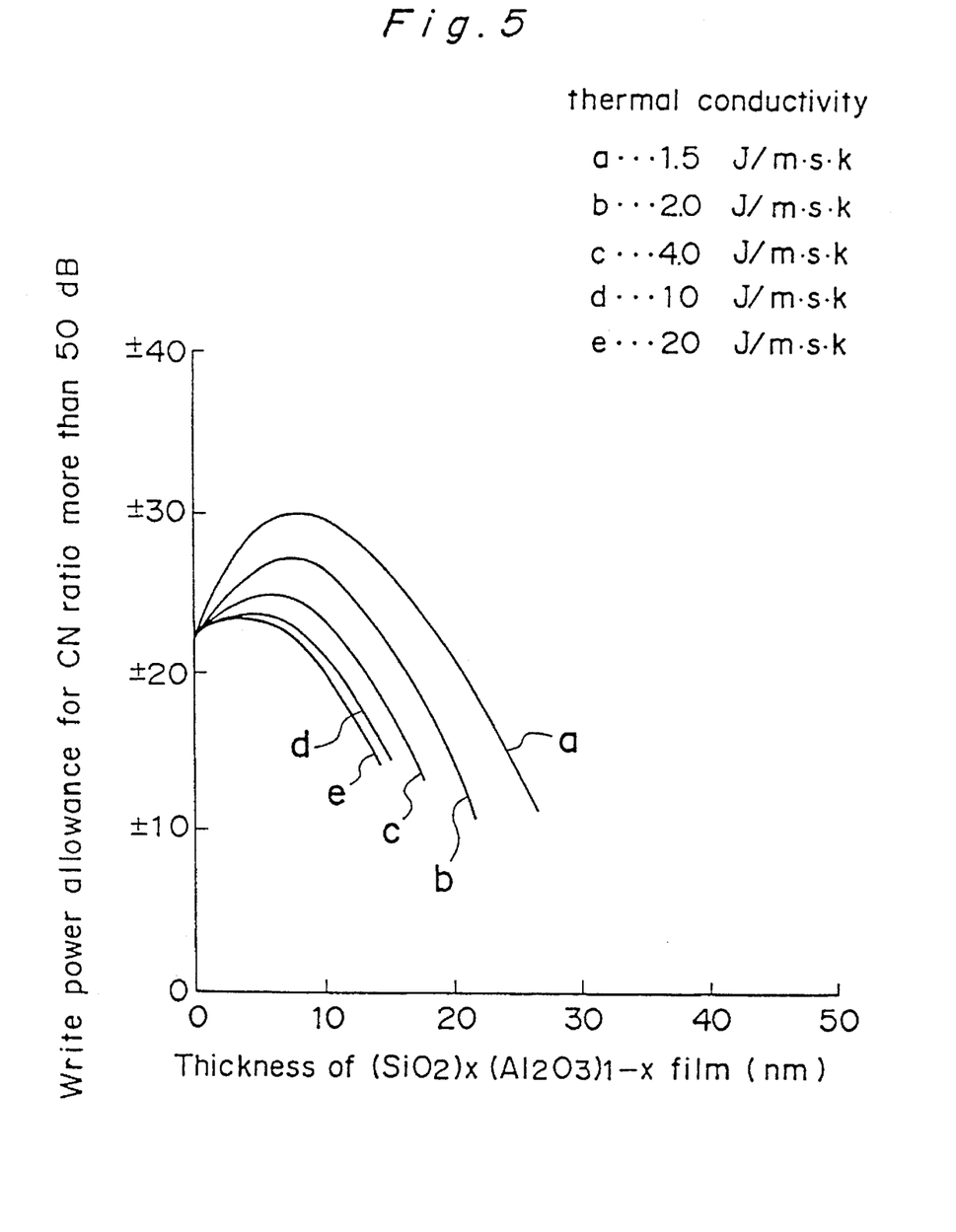

Write/read operation was performed using a magneto-optical disk of the construction as shown in the fourth embodiment, and the CN ratio was measured. The conditions for the write/read operation were, as in the first embodiment, a linear velocity of 6 m/s, a signal frequency of 3.85 MHz, a writing pulse width of 86 nsec, and readout power of 1 mW. The results are shown in FIG. 5. In FIG. 5, the vertical axis represents the writing power allowance in which the CN ratio more than 50 dB can be obtained. The horizontal axis represents the thickness of the dielectric layer 14 made of the mixture of $(SiO_2)_x(Al_2O_3)_{1-x}$. The parameter in this case is the thermal conductivity of $(SiO_2)_x(Al_2O_3)_{1-x}$, where reference characters stand: (a) for a thermal conductivity of 15 J $(m\ sec\ K)^{-1}$; (b) for that of 2 J $(m\ sec\ K)^{-1}$; (c) for that of 4 J $(m\ sec\ K)^{-1}$; (d) for that of 10 J $(m\ sec\ K)^{-1}$; and (e) for that of 20 J $(m\ sec\ K)^{-1}$. As apparent from FIG. 5, when the thermal conductivity of the dielectric layer 14 is not more than 4 $(m\ sec\ K)^{-1}$, extension of the writing power allowance in which the CN ratio more than 50 dB can be obtained can be recognized depending on appropriate setting of the thickness of the dielectric layer. The appropriate setting of thickness here mentioned is, if the thickness is T (nm) and the thermal conductivity is CJ $(msec\ K)^{-1}$, $$3 \leq T \leq 13\ (C/2.1)^{-0.4} \quad (1)$$

As described above, according to the above embodiment, there is provided an extremely thin dielectric layer having a thermal conductivity of not more than 4 J $(m\ sec\ K)^{-1}$ that meets the above requirements, whereby the writing power allowance can be extended considerably.

As a fifth embodiment, the enhance layer 12 was made of 80 nm thick ZnS; the magneto-optical layer 13 was made of 40 nm thick TbFeCo; and the dielectric layer 14 was made of a mixture of $(ZnS)_x(MgO.SiO_2)_{1-x}$. In this case, the thermal conductivity of the dielectric layer 14 was constant at 2.1 J $(m\ sec\ K)^{-1}$ irrespective of the mixing ratio, and the refractive index was subject to change in the range of 1.5 to 2.2 depending on the mixing ratio. The reflection layer 15 was 40 nm thick AlTi, and the protection layer 16 was 100 nm thick ZnSe.$SiO_2$.

Figure 6:
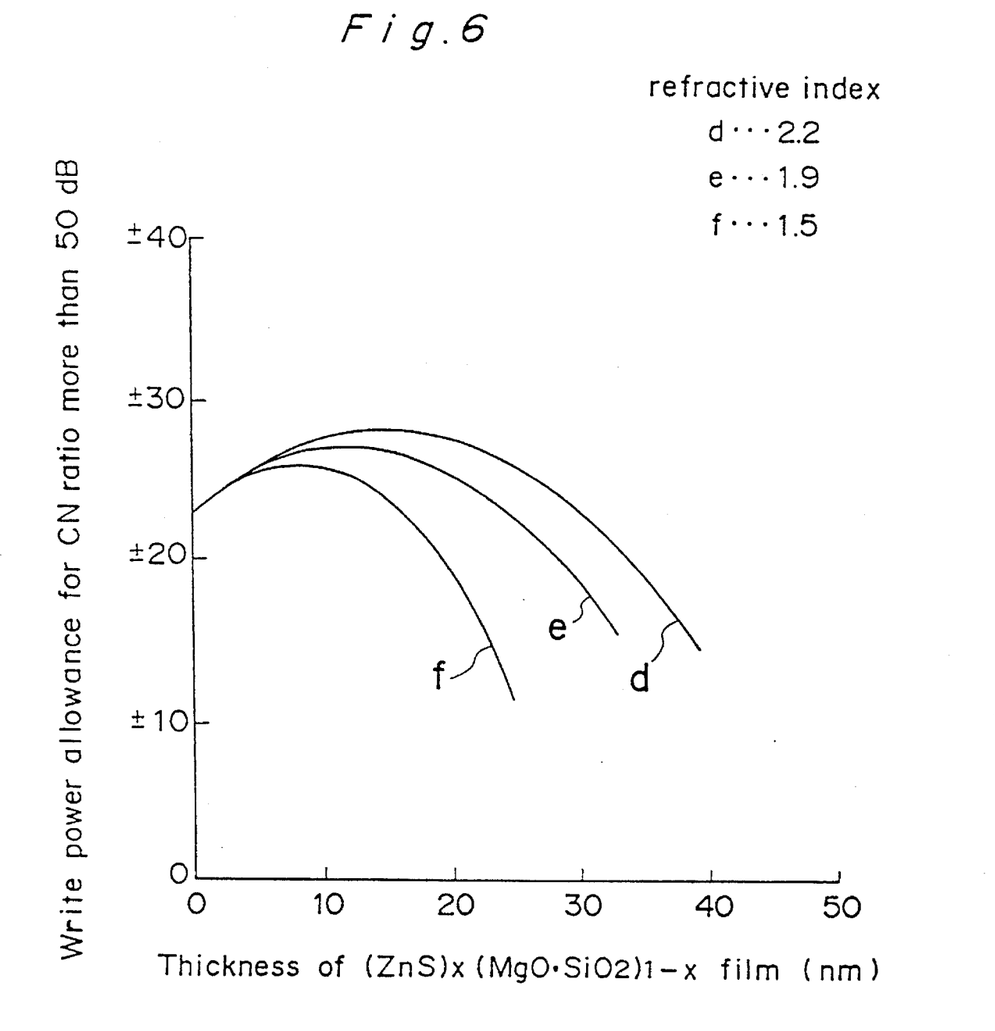

Write/read operation was performed using a magneto-optical disk of the construction as shown in the fifth embodiment, and the CN ratio was measured. The conditions for the write/read operation were, as in the first embodiment, a linear velocity of 6 m/s, a signal frequency of 3.85 MHz, a writing pulse width of 86 nsec, and readout power of 1 mW. The results are shown in FIG. 6. In FIG. 6, the vertical axis represents the writing power allowance in which the CN ratio more than 50 dB can be obtained. The horizontal axis represents the thickness of the dielectric layer 14 made of $(ZnS)_x(MgO.SiO_2)_{1-x}$. The parameter in this case is the refractive index of $(ZnS)_x(MgO.SiO_2)_{1-x}$, where reference characters stand: (a) for a refractive index of 2.2; (b) for that of 1.9; and (c) for that of 1.5.

As apparent from FIG. 6, when the refractive index of the dielectric layer 14 is 1.5 to 2.2, extension of the writing power allowance in which the CN ratio more than 50 dB can be obtained can be recognized depending on appropriate setting of the thickness of the dielectric layer. The appropriate setting of thickness here mentioned is, if the thickness is T (nm) and the refractive index is n, $$5n-4 \leq T \leq 12n-4 \quad (2)$$

As described above, according to the above embodiment, there is provided an extremely thin dielectric layer that meets the above requirements, whereby the writing power allowance can be extended considerably.

Furthermore, taking the embodiments 4 and 5 together, the thickness of the dielectric layer T (nm) is preferably $$5n-4 \leq T \leq (12n-4)(C/2.1)^{-0.4} \quad (3)$$

where $C \leq 4J\ (m\ sec\ K)^-$.

Although the substrate 11 is provided by a plastic substrate in the first embodiment, it may also be provided by a glass substrate or a composite one of the two without affecting the effect of the present invention.

Although the enhance layer 12 is provided by ZnSe.$SiO_2$ or ZnS in the embodiments, it may also be provided by some other nitride (e.g. SiN, AlN), oxide (e.g. SiO, $Ta_2O_5$), chalcogenide compound (e.g. ZnSe, PbS), or mixture thereof (e.g. SiAlON, AlON, 2MgO.$SiO_2$).

Although the magneto-optical layer 13 is provided by TbFeCo in the embodiments, it may also be provided by any of TbFe, DyFeCo, GdTbFeCo, or the like.

Although the dielectric layer 14 is provided by ZnSe.$SiO_2$, ZnS, $SiO_2$, $(SiO_2)_x(Al_2O_3)_{1-x}$, or $(ZnS)_x(MgO.SiO_2)_{1-x}$ in the embodiments, it may also be provided by any of $ZrO_2$, SiO, ZnS.$SiO_2$, 2MgO.$SiO_2$, $3Al_2O_3.2SiO_2$, and the like, which are superior in light transmittance, only if the thermal conductivity is less than 4 J $(m\ sec\ K)^{-1}$. For example, ZnS.ZnSe can be used therefor. It is also possible to make use of metal oxides or metal nitrides, which have thermal conductivities more than 4 J $(m\ sec\ K)^{-1}$ in the form of simple substances, have ones less than 4 J $(m\ sec\ K)^{-1}$ by mixing them with a considerable quantity of SiO or $SiO_2$. Taking into consideration the reliability of magneto-optical layers, however, the dielectric layer is preferably a chalcogenide compound such as ZnS, ZnS.$SiO_2$, ZnSe.$SiO_2$, and $(ZnS)_x(MgO.SiO_2)_{1-x}$, or a mixture of chalcogenide compounds and $SiO_2$. In particular, layers made of an organic compound such as polytetrafluoroethylene are inferior in reliability, thus undesirable.

Although the reflection layer 15 is provided by CuV or AlTi in the embodiments, it may also be any one of layers mainly composed of Al, Cu, Ag, Au, or the like.

Although the protection layer 16 is provided by ZnSe.SiO₂ or ZnS.SiO₂ in the embodiments, the protection layer 16 is not necessarily involved, being used here only for the purpose of preventing the reflection layer from corrosion.

Although the disk is of single substrate type in the embodiments, the present invention is applicable also to that of double substrate type.

As described heretofore, the present invention has such an arrangement that a magneto-optical layer and a reflection layer are superimposed on each other with a dielectric layer interposed therebetween, wherein the thermal conductivity of the dielectric layer is made less than 4 J (m sec K)$^{-1}$ and the thickness is set to within the range of 30 to 24 nm, thereby allowing the writing power allowance in which the CN ratio more than 50 dB-can be obtained to be farther extended as compared with conventional cases. This then allows the power margin of writing power to be extended, contributing to the following possible effects:

1. Compensation for variation in sensitivity of the disk due to variation in operating temperature is obviated;
2. The power at writing may roughly be set;
3. The disk is loosely restricted in its sensitivity distribution, and therefore easy to fabricate;
4. The precision allowance of focus at writing is increased.

Moreover, in a conventional structure in which the magneto-optical layer and the reflection layer are in contact with each other without the interposition of the dielectric layer, the present invention serves to suppress expansion of the written domain due to excessive power at writing and to improve the sensitivity at writing.

The present invention further allows signal levels to be increased in another structure in which a magneto-optical layer and a reflection layer are superimposed on with each other with a dielectric layer having a thickness of more than 30 nm interposed therebetween.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium having a writing power allowance for a C/N ratio of more than 50 dB exceeding ±25% comprising a substrate and an inorganic dielectric layer interposed between a magneto-optical layer and a reflection layer, wherein a) the refractive index of said dielectric layer is within a range from 1.5 to 2.2,
   b) the thickness of said dielectric layer is within a range from 3 to 17 (nm), and
   c) the thermal conductivity of said dielectric layer is within a range from 1.5 to 2.2 (J(m sec K)$^{-1}$), wherein if the refractive index of said dielectric layer is n, thickness of said dielectric layer is T (nm), and thermal conductivity of the dielectric layer is C (J (m sec K)$^{-1}$), then the thickness T is within a range that satisfies the following equation:

$$5n-4 \leq T \leq (12n-4)(C/2.1)^{-0.4}$$

where $C \leq 4J$ (m sec K)$^{-1}$.

2. The magneto-optical recording medium as claimed in claim 1, wherein the said dielectric layer is ZnS, and the thickness of the said dielectric layer is substantially 13 (nm).

3. The magneto-optical recording medium as claimed in claim 1, wherein the said dielectric layer is a mixture of ZnSe and $SiO_2$, and the thickness of the said dielectric layer is substantially 13 (nm).

4. A magneto-optical recording medium having a write power allowance for a C/N ratio of more than 50 dB exceeding ±25% comprising a substrate and an inorganic dielectric layer interposed between a magneto-optical layer and a reflection layer, wherein a) the refractive index of said dielectric layer is within a range from 1.5 to 2.2,
   b) the thickness of said dielectric layer is within a range from 2 to 17 (nm),
   c) the thermal conductivity of said dielectric layer is within a range from 1.5 to 2.2 (J(m sec K)$^{-1}$), and
   d) said dielectric layer is $SiO_2$, wherein if the refractive index of said dielectric layer is n, thickness of said dielectric layer is T (nm), and thermal conductivity of the dielectric layer is C (J (m sec K)$^{-1}$), then the thickness T is within a range that satisfies the following equation:

$$5n-4 \leq T \leq (12n-4)(C/2.1)^{-0.4}$$

where $C \leq 4J$ (m sec K)$^{-1}$.

5. The magneto-optical recording medium as claimed in claim 4, wherein the thickness of the said dielectric layer is substantially 8 (nm).

6. A magneto-optical recording medium having a write power allowance for a C/N ratio of more than 50 dB exceeding ±25% comprising an inorganic dielectric layer interposed between a magneto-optical layer and a reflection layer, wherein if the refractive index of said dielectric layer is n, thickness of said dielectric layer is T (nm), and thermal conductivity of said dielectric layer is c (J (m sec K)$^{-1}$), then the thickness T is within a range that satisfies the following equation:

$$5n-4 \leq T \leq (12n-4)(C/2.1)^{0.4}$$

where $C \leq 4J$ (m sec K)$^{-1}$.

7. The magneto-optical recording medium of claim 6, wherein the inorganic dielectric layer is composed of a material selected from the group consisting of $ZnSe.SiO_2$, ZnS, $SiO_2$, $(SiO_2)_x(Al_2O_3)_{1-x}$, and $(ZnS)_x(MgO.SiO_2)_{1-x}$, wherein $1 > x > 0$.

8. The magneto-optical recording medium of claim 6, wherein the reflection layer is composed of Al, Cu, Ag, Au, CuV or AlTi.

9. The magneto-optical recording medium of claim 7, wherein the inorganic dielectric layer is ZnS and the thickness T of the layer is in a range from 3 to 24 nm.

10. The magneto-optical recording medium of claim 7, wherein the inorganic dielectric layer is $SiO_2$ and the thickness T of the layer is in a range from 2 to 17 nm.

11. The magneto-optical recording medium of claim 7, wherein the inorganic dielectric layer is $ZnSe.SiO_2$ and the thickness T of the layer is in a range from 3 to 24 nm.

12. The magneto-optical recording medium of claim 7, wherein the inorganic dielectric layer is $(SiO_2)_x(Al_2O_3)_{1-x}$, the refractive index n of the dielectric material ranges from 1.5 to 1.6, the thermal conductivity C of the dielectric layer ranges from 1.5 to 4 J, and the thickness T is defined by the relationship $3 \leq T \leq 13(C/2.1)^{-0.4}$.

13. The magneto-optical recording medium of claim 7, wherein the inorganic dielectric layer is $(ZnS)_x(MgO \cdot SiO_2)_{1-x}$, the refractive index n of the dielectric material ranges from 1.5 to 2.2, the thermal conductivity C of the dielectric layer is 2.1 J, and the thickness T is defined by the relationship $5n-4 \leq T \leq 12n-4$.

14. The magneto-optical recording medium of claim 8, wherein the reflection layer is composed of CuV or AlTi.

* * * * *